(12) United States Patent
Dortch et al.

(10) Patent No.: US 7,624,947 B2
(45) Date of Patent: Dec. 1, 2009

(54) ARMAMENT CARRIAGE SYSTEM

(75) Inventors: Kevin A. Dortch, Los Angeles, CA (US); Daniel J. Hare, Santa Monica, CA (US)

(73) Assignee: Black Rum Engineering Services LLC, Kirkland, WA (US)

( * ) Notice: Subject to any disclaimer, the term of this patent is extended or adjusted under 35 U.S.C. 154(b) by 216 days.

(21) Appl. No.: 11/759,857

(22) Filed: Jun. 7, 2007

(65) Prior Publication Data
US 2008/0302234 A1 Dec. 11, 2008

(51) Int. Cl.
*B64D 1/12* (2006.01)
(52) U.S. Cl. ............ 244/137.4; 244/136; 244/118.2; 244/118.1; 244/56; 244/54; 89/1.51
(58) Field of Classification Search ............ 244/137.4, 244/136, 118.2, 118.1, 56, 54; 89/1.51, 1.53, 89/1.54, 1.816, 1.802, 1.81, 37.16, 37.19
See application file for complete search history.

(56) References Cited

U.S. PATENT DOCUMENTS

| | | | | |
|---|---|---|---|---|
| 3,295,410 A * | 1/1967 | Edwards | ............... | 89/1.51 |
| 3,650,341 A * | 3/1972 | Asmussen | ............... | 180/190 |
| 3,984,837 A * | 10/1976 | Tatnall | ............... | 343/705 |
| 4,343,447 A * | 8/1982 | Reed, III | ............... | 244/137.4 |
| 4,417,709 A * | 11/1983 | Fehrm | ............... | 244/136 |
| 4,589,615 A * | 5/1986 | Walker, Jr. | ............... | 244/137.4 |
| 5,359,917 A * | 11/1994 | Travor | ............... | 89/1.51 |
| 5,406,876 A * | 4/1995 | Harless et al. | ............... | 89/1.54 |
| 5,970,842 A * | 10/1999 | Knapp et al. | ............... | 89/1.54 |
| 6,634,599 B2 * | 10/2003 | Griffin | ............... | 244/137.4 |
| 6,663,048 B2 * | 12/2003 | Weelden et al. | ............... | 244/137.4 |
| 6,688,209 B1 * | 2/2004 | McMahon et al. | ............... | 89/1.59 |
| 7,007,895 B2 * | 3/2006 | Jakubowski et al. | ............... | 244/137.4 |
| 7,156,347 B2 * | 1/2007 | Lam et al. | ............... | 244/137.4 |
| 2002/0088902 A1 * | 7/2002 | Griffin | ............... | 244/137.4 |
| 2006/0081733 A1 * | 4/2006 | Lam et al. | ............... | 244/137.4 |

* cited by examiner

*Primary Examiner*—Michael R Mansen
*Assistant Examiner*—Justin Benedik
(74) *Attorney, Agent, or Firm*—Christensen O'Connor Johnson Kindness PLLC

(57) ABSTRACT

A carriage and release system for stores (armaments such as rockets and bombs) on an aircraft includes a bracket adapted for attachment to the aircraft. A pylon is mounted on the bracket for movement in a pitch direction relative to the aircraft. A mechanism is provided to power the pitch movement and position it at a predetermined angle relative to the aircraft. A variety of stores carriers may be employed with the pylon. Subcarriages may also be mounted to the pylon for attaching additional stores carriers.

13 Claims, 11 Drawing Sheets

US 7,624,947 B2

ARMAMENT CARRIAGE SYSTEM

BACKGROUND

Releasable stores (armament such as bombs, rockets, flares, and the like) for manned aircraft are usually positioned on proprietary carriages and release mechanisms that are designed to integrate with a conventional piloted aircraft. These systems are highly specific to the aircraft and are not readily adaptable to other aircraft.

On the other hand, small, remotely controlled, pilotless aircraft are much lighter in weight than conventional aircraft and are designed primarily for surveillance, but can also be adapted to carry releasable stores. The number and type of pilotless aircraft and other drones are quite large compared to the number of conventional manned aircraft in the military. Release and armament systems for each of these aircraft would normally be designed on an aircraft-by-aircraft basis, thus resulting in substantial design time and expense associated with adapting the unmanned aircraft to carry stores.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention, therefore, provides a configurable carriage and release system for drones and remotely controlled pilotless aircraft that are lightweight, that are easily adapted to a variety of wings and air frames, and that are interchangeable. The carriage and release system can be adapted to carry a wide variety of stores that vary in size, armament, releasability, and other configurations. In its broadest aspect, the present invention provides a carriage and release system for stores carried on an aircraft that comprises a bracket adapted for attachment to the aircraft and a pylon mounted on the bracket for movement in a pitch direction relative to the aircraft. The pylon preferably has a mounting port that receives a removable stores carrier. The pylon also carries a bracket for removably connecting a variety of other subcarriages and stores release mechanisms.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
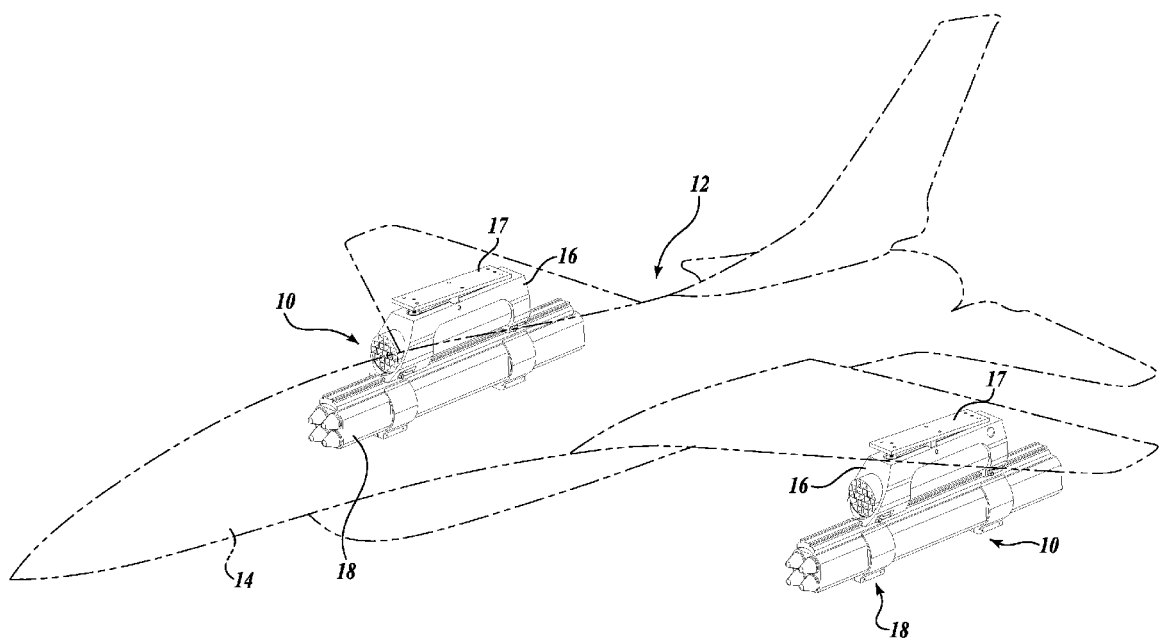
FIG. 1 is an isometric view of the carriage and release system shown mounted on the left and right wings of an unmanned aircraft (shown in phantom)

Referring now to FIG. 1, the carriage and release system 10 is shown in dual configuration mounted on the left and right wings of a remotely piloted aircraft 12. The carriage and release system 10 can, of course, be connected to any portion of the aircraft, including the wings, fuselage 14, or any other appendage of the aircraft. The carriage and release system as shown in FIG. 1 includes a pylon 16 attached to a bracket 17, which in turn is affixed to the wings of the aircraft 12. Affixed to the bottom of the pylon 16 is a subcarriage 18, which is one of a variety of subcarriages that may be attached to the pylon 16.

Figure 2:
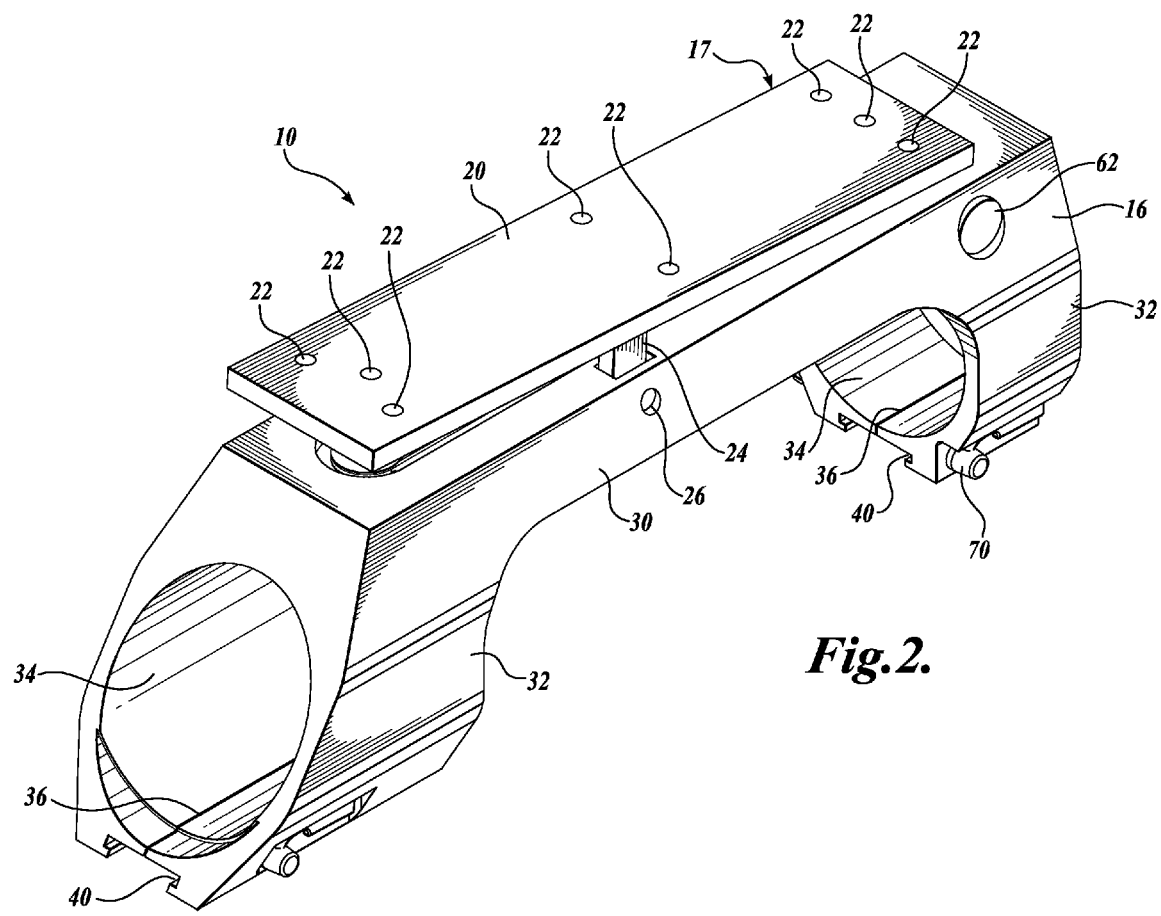
FIG. 2 is an enlarged isometric view of the carriage and release system shown attached to the aircraft in FIG. 1.

The carriage and release system 10, as shown in FIG. 2, includes the pylon 16 and the bracket 17. The bracket 17 has an upper surface 20 that is either flat or can be conformed to the surface to which it is to be mounted. If flat, and the surface to which it is to be mounted is curved, a variety of spacers (not shown) can be utilized to make the attachments. The bracket 17 is attached to the aircraft, whether it is the wing or fuselage, with conventional fasteners that extend through a plurality of apertures 22 that can be positioned in the bracket 17 at any of a variety of locations suitable to one of ordinary skill. The pylon 16 is pivotally attached to the bracket via arm 24 and transverse pivot pin 26, which will be described in more detail below. The pylon 16 comprises a main body 30 that extends fore and aft or in the longitudinal direction. Arms 32 extend downwardly from the front and back portions of the body 30. The arms and body 30 are preferably integrally formed; however, they can be formed of separate components if desired. The pylon 16 defines a mounting port 34 in both forward and rearward arms 32 having a cylindrical interior. The mounting port 34 in the forward arm and the rearward arm are axially aligned in the fore and aft direction. The bottom of each of the arms 32 carries a longitudinal slot 36 that extends all the way through the bottoms of the forward and rearward arms. The arms 32 are made of a flexible but resilient material so that the bottom of the arms can be pinched together so as to slightly decrease the diameter of the mounting ports to securely fasten a stores carrier therein, as will be described in more detail below. In addition, the bottom of the arms each have a longitudinal T-shaped slot 40, again aligned in the fore and aft direction. The bottom of the slot opens downwardly from the arms 32. The purpose of the slot 40 will be described in more detail below.

Figure 3A:
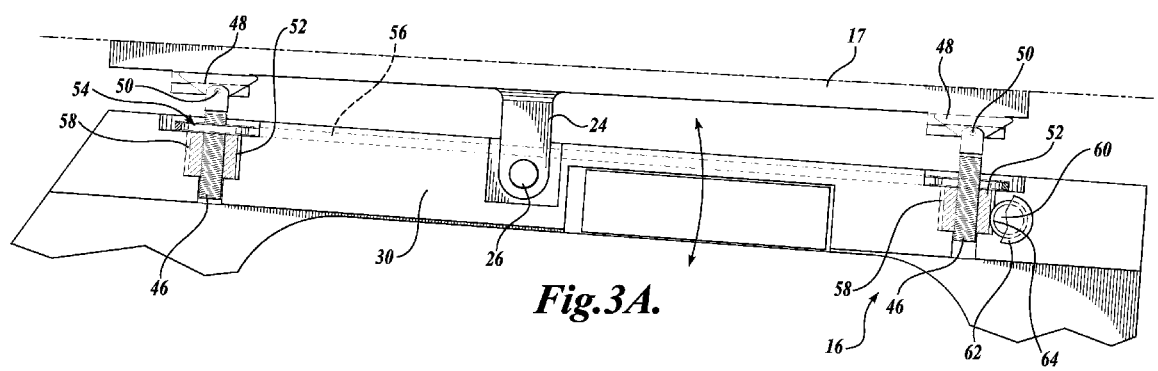
FIGS. 3A and 3B are enlarged longitudinal views in partial section of the mounting system for connecting the pylon and the bracket that comprises the carriage and release system.
Figure 3B:
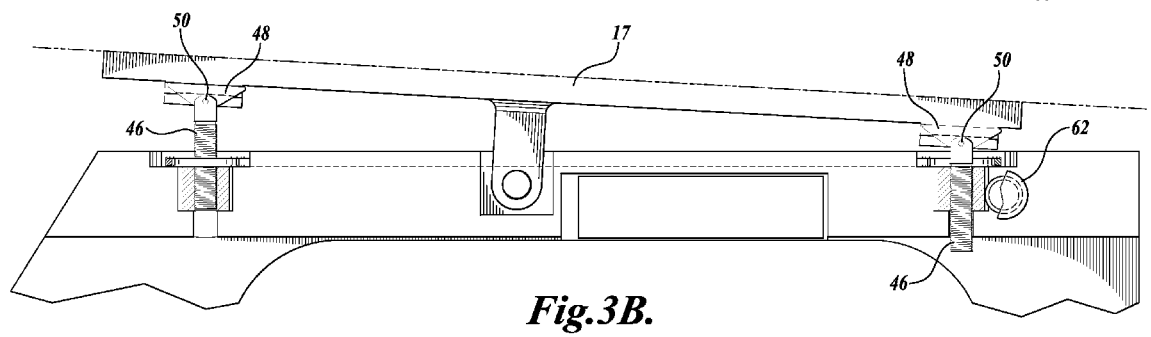

Referring now to FIGS. 3A and 3B, the bracket 17 is shown mounted to an aircraft structure (shown in phantom). The pylon 16 depends from the bracket 17 via pivot pin 26 which extends transversely through arm 24 of the bracket 17. The downwardly extending arm 24 is affixed at its upper end to the bottom side of the bracket 17. The pylon is journaled on the pivot pin 26; thus, the pylon 16 can pivot about the pivot pin 26. Because the arm is mounted in the fore and aft direction on the aircraft, this pivotal movement of the pylon 16 adjusts the pitch of the pylon relative to the aircraft; thus, the aircraft can be flying in a horizontal mode while the pylon can be pivoted either upwardly or downwardly to pitch the pylon downwardly or upwardly so as to point the stores mounted on the pylon 16 in a downward or upward direction relative to the aircraft.

In one embodiment, the pivotal movement of the pylon is driven by a power mechanism. In a preferred embodiment, the pivotal movement of the pylon is powered by a pair of jack screws 46. The upper ends of the jack screws 46 are pivotally mounted to the underside of the bracket 17 via downwardly depending bracket 48 and pivot pin 50. The jack screws 46 carry external threads that mate with internal threads on gear members 52, which are journaled in the upper portion of the pylon 16 and spaced fore and aft from the pivot arms 24. Gear members 52 have integral pulleys 54 that are coupled together by an endless belt 56 so that when one gear member is rotated, both gear members 52 will rotate simultaneously with each other. The lower portion of the gear members 52 contains vertical splines or gear teeth 58. In this embodiment, a shaft 60 containing a worm gear 64 at its end engages the splines 58 on the rear gear member 52. As the worm gear 64 is rotated, the rear gear member 52 is rotated. The forward gear member 52, which is slaved to the rear gear member by the pulleys 54 and belt 56, rotates as the rear gear member is rotated. The worm gear 64 is driven by a motor 62 mounted in the pylon and powered from an external source (not shown). The jack screws 46 are counterthreaded so that as the gear members 52 rotate, the aft jack screw will move in a vertical direction opposite from the forward jack screw 46. Thus, as the jack screws move in opposite vertical directions, they will simultaneously work together to pivot the pylon 16 about the pivot pin 26.

Figure 4:
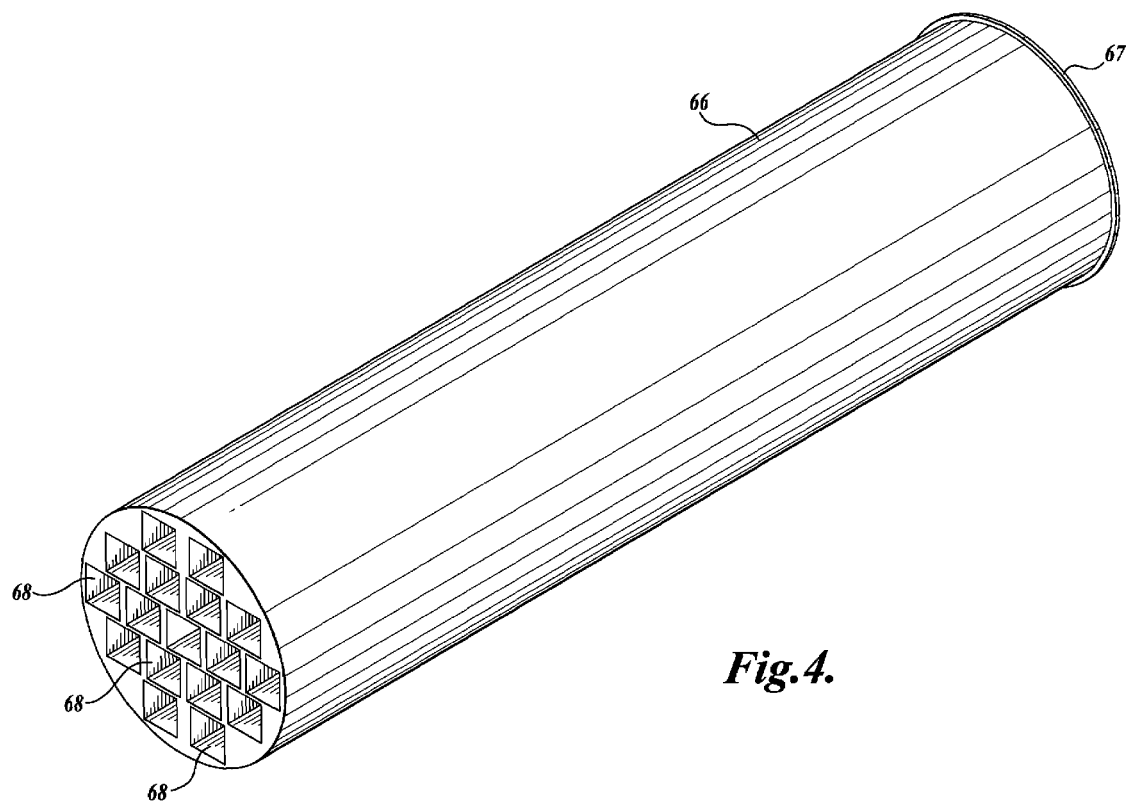
FIG. 4 is an isometric view of a stores carrier adapted for mounting in the pylon shown in FIG. 3.

One embodiment of a stores carrier 66 is illustrated in FIG. 4. Stores carrier 66 is inserted in the mounting port 34 of the pylon 16 from the rear. Stores carrier 66 has a rear shoulder 67 that abuts against the rear of the pylon 16 to index it in place. In this embodiment, the stores carrier has a plurality of axial channels 68 that run the entire length of the stores carrier. The axial channels 68 may carry flares, rockets, or other self-powered stores that can be fired from the stores carrier 66.

Figure 5:
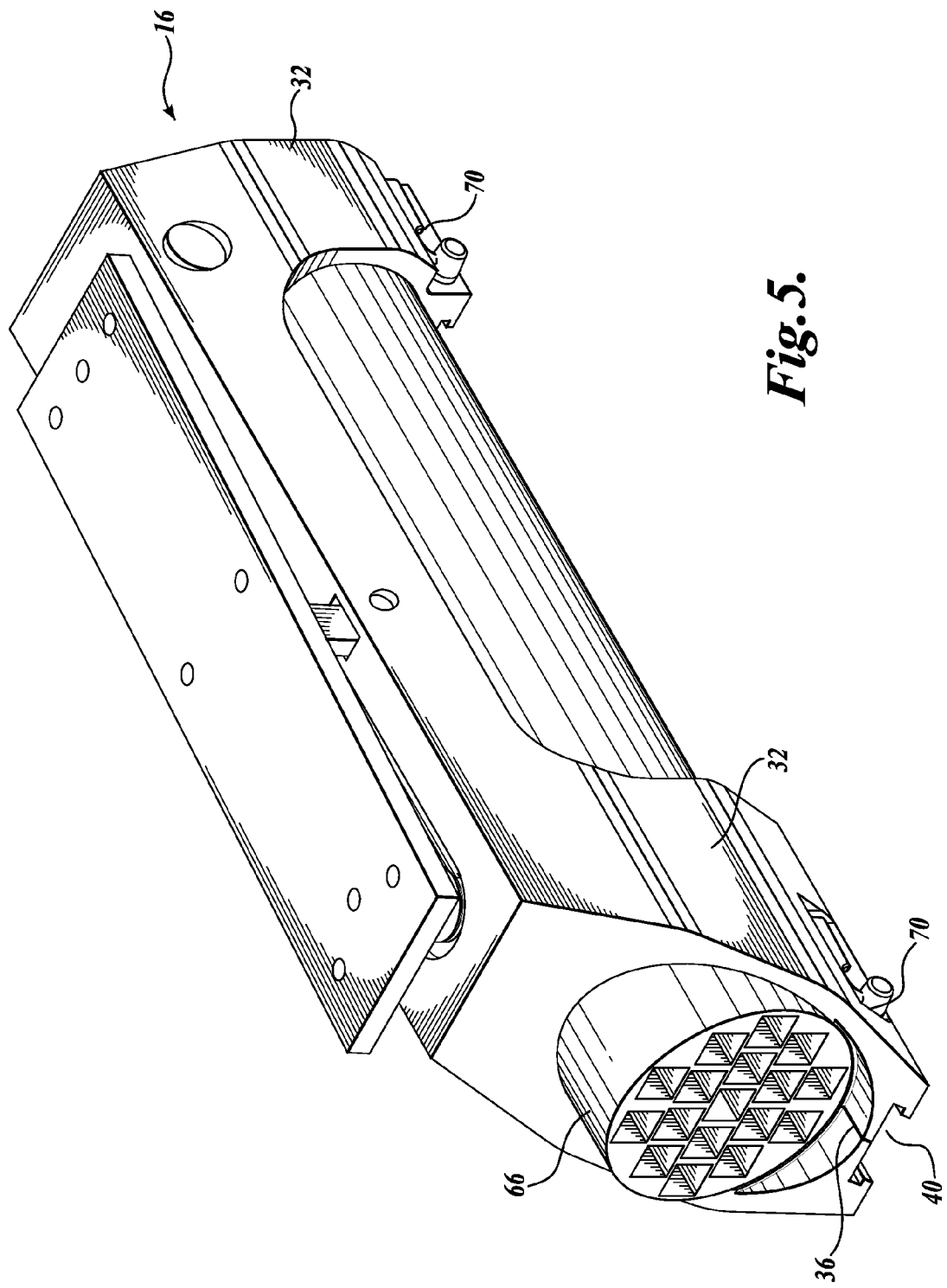
FIG. 5 is an isometric view showing the stores carrier mounted in the pylon.

In FIG. 5, the stores carrier 66 is shown mounted in the pylon 16. As can be seen, it extends from the rear arm 32 forwardly to the forward arm 32 of the pylon 16. The stores carrier 66 is held firmly in place in the pylon 16 by the co-action of cam mechanisms 70 mounted on the bottom of the arms 32 of the pylon 16. As the cam mechanism 70 is rotated, it causes the bottom end of the arms to be pinched together so that the slot 36 is made smaller, thus reducing the diameter of the chamber mounting port 34 and firmly clamping the stores carrier 66 in place.

Figure 6:
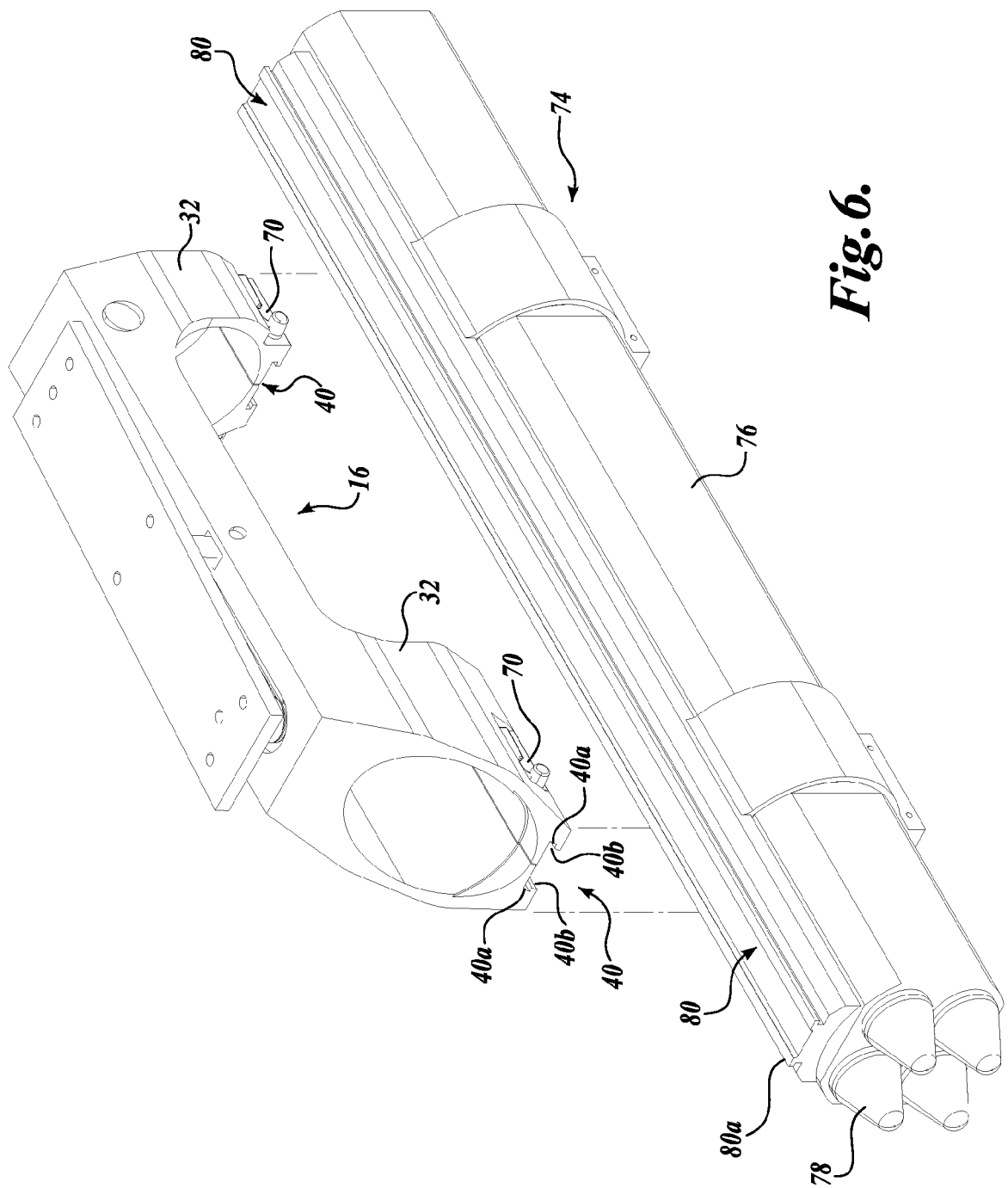
FIG. 6 is an isometric view of the carriage and release system showing a bracket-mounted subcarriage mounted to the bottom of the pylon.
Figure 7:
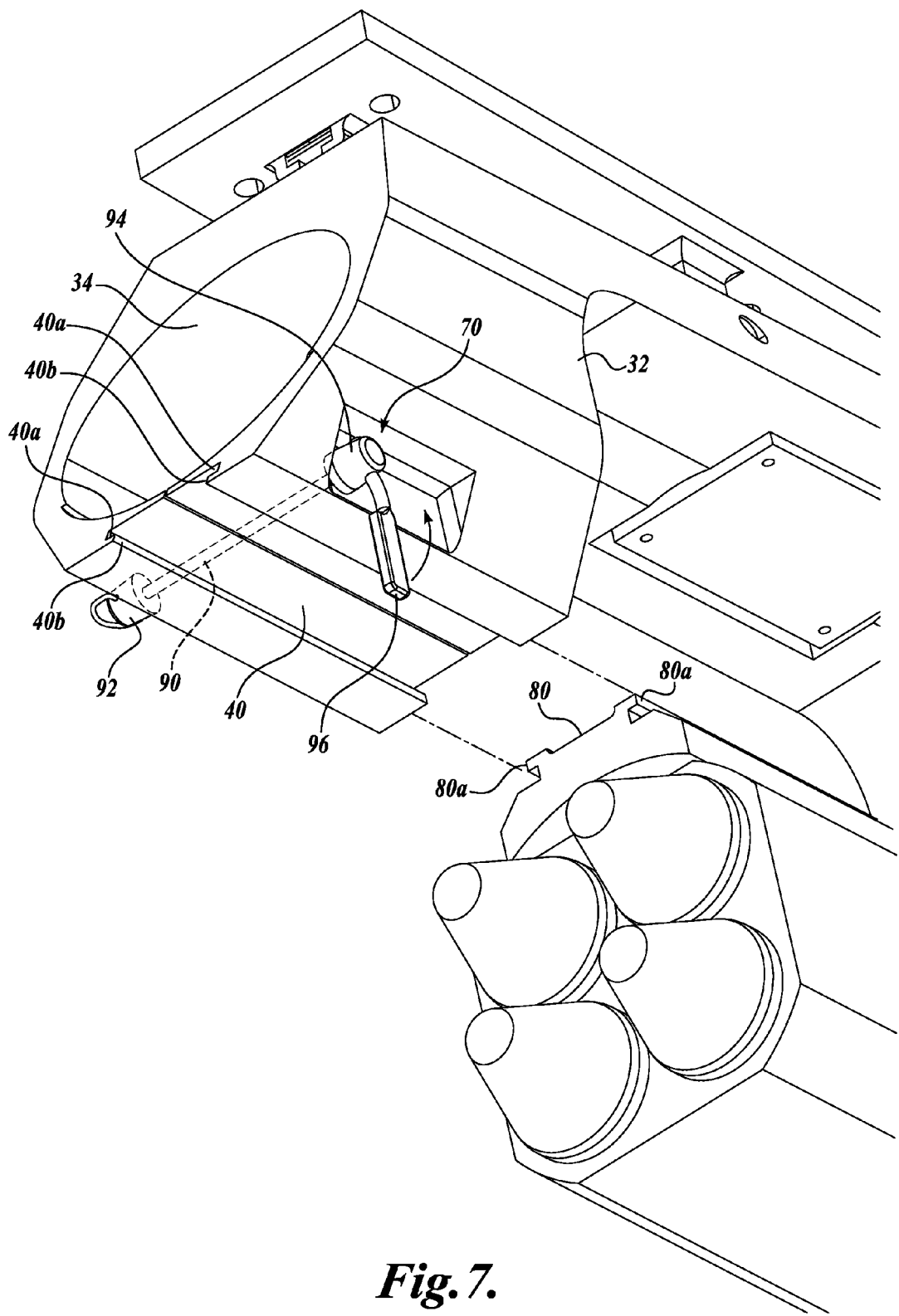
FIG. 7 is an enlarged view illustrating the connection of the subcarriage to the pylon.

Referring now to FIGS. 6 and 7, a carrier subassembly 74 is shown for mounting a different type of store on the bottom of the pylon 16. The subassembly 74 has a stores carrier 76, which in this embodiment has a plurality of longitudinal bores that carry self-launched stores 78. The upper portion of the subassembly 74 carries a rail 80 having an inverse-T configuration that fits in the slots 40 in the bottom of the arms 32 of the pylon 16. The slot 40 has outwardly extending slot portions 40a that terminate in bottom inwardly-directed shoulders 40b. Rail 80 has outwardly directed flanges 80a that fit within the slots 40 so as to slidably position the subassembly 74 under the pylon. Depending on the weight distribution of the subassembly 74, it can be moved fore and aft, as desired, in the slots 40. Once the subassembly 74 is positioned on the pylon, the same cam mechanism 70 that holds a stores carrier in place in the pylon also clamps the slots 40 together to place a friction grip on the rail 80 and, thus, secures the subassembly 74 at the desired location.

Still referring to FIG. 7, the cam mechanism 70 comprises the shaft 90 that extends transversely through the arm 32 and threads into head 92 on one side of the arm 32. The other end of the shaft 90 is threaded into a nut 94 having a lever arm 96 attached thereto. When the rail 80 is in place in the slot 40, the shaft 90 is snugged down by rotating the head 92 until finger-tight. Then the arm 96 is rotated to tighten the nut 94 beyond finger-tension-tight so that a secure friction grip is held not only on the rail 80, but any stores carrier mounted in the port 34. A similar cam mechanism 70 is also integrated into the rearward arm 32 of the pylon 16.

Figure 8:
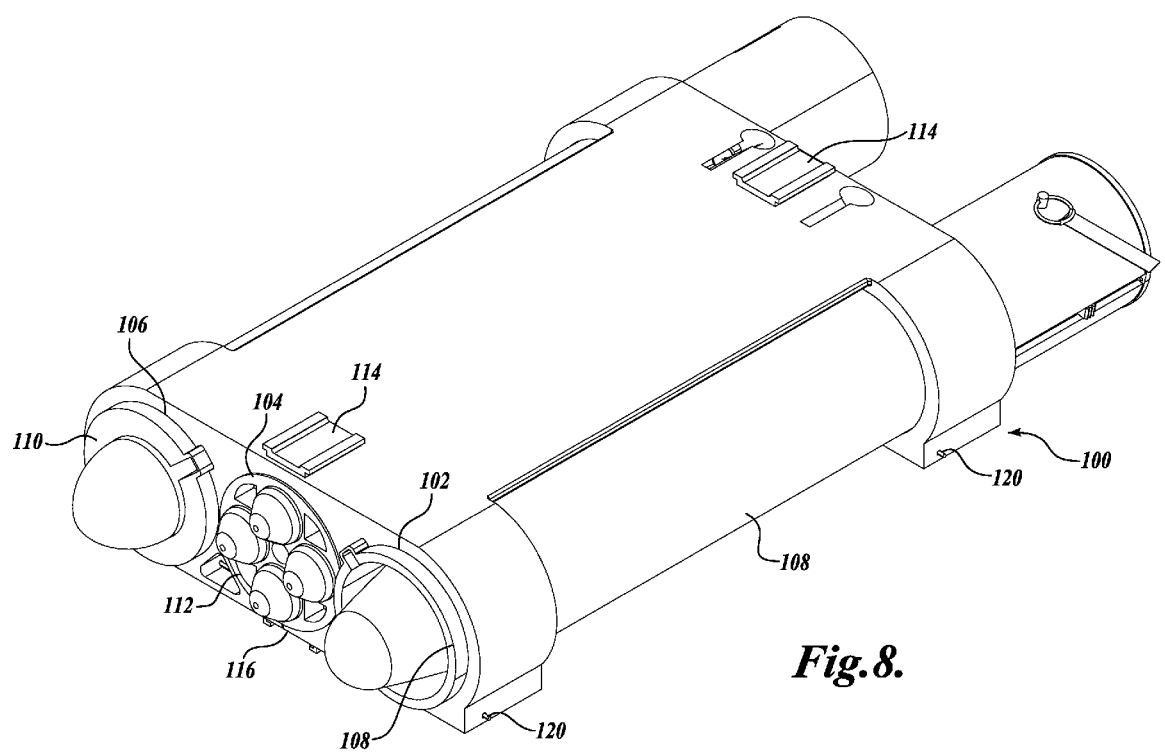
FIG. 8 is an isometric view of a second embodiment of a subcarriage having three mounting ports for stores carriers.

Referring now to FIG. 8, another type of subcarriage assembly 100 is illustrated. This subcarriage assembly 100 has three mounting ports 102, 104, and 106, in each of which is mounted a stores carrier 108, 110, or 112. As depicted, the stores and stores carrier may be different for each of the ports of the subcarriage 100. Subcarriage assembly 100 has rails 114 on its upper side that can be coupled directly to the slots in the bottom of the pylon 16. In addition, if desired, this subcarriage 100 can also carry a slotted member 116 on the bottom thereof so that another subcarriage assembly can be similarly mounted to the bottom of this subcarriage. The carriers 108, 110, and 112 are secured in the mounting ports 102, 104, and 106 by the cam mechanisms 120 on both the fore and aft depending arms of the subcarriage 100. Each of the arms carries a longitudinal slot extending along its entire length below each of the mounting ports. The cam mechanisms 120 pull the bottoms of the arms together to decrease the width of the slot and, thus, securely grip the stores in each of the mounting ports.

Figure 9:
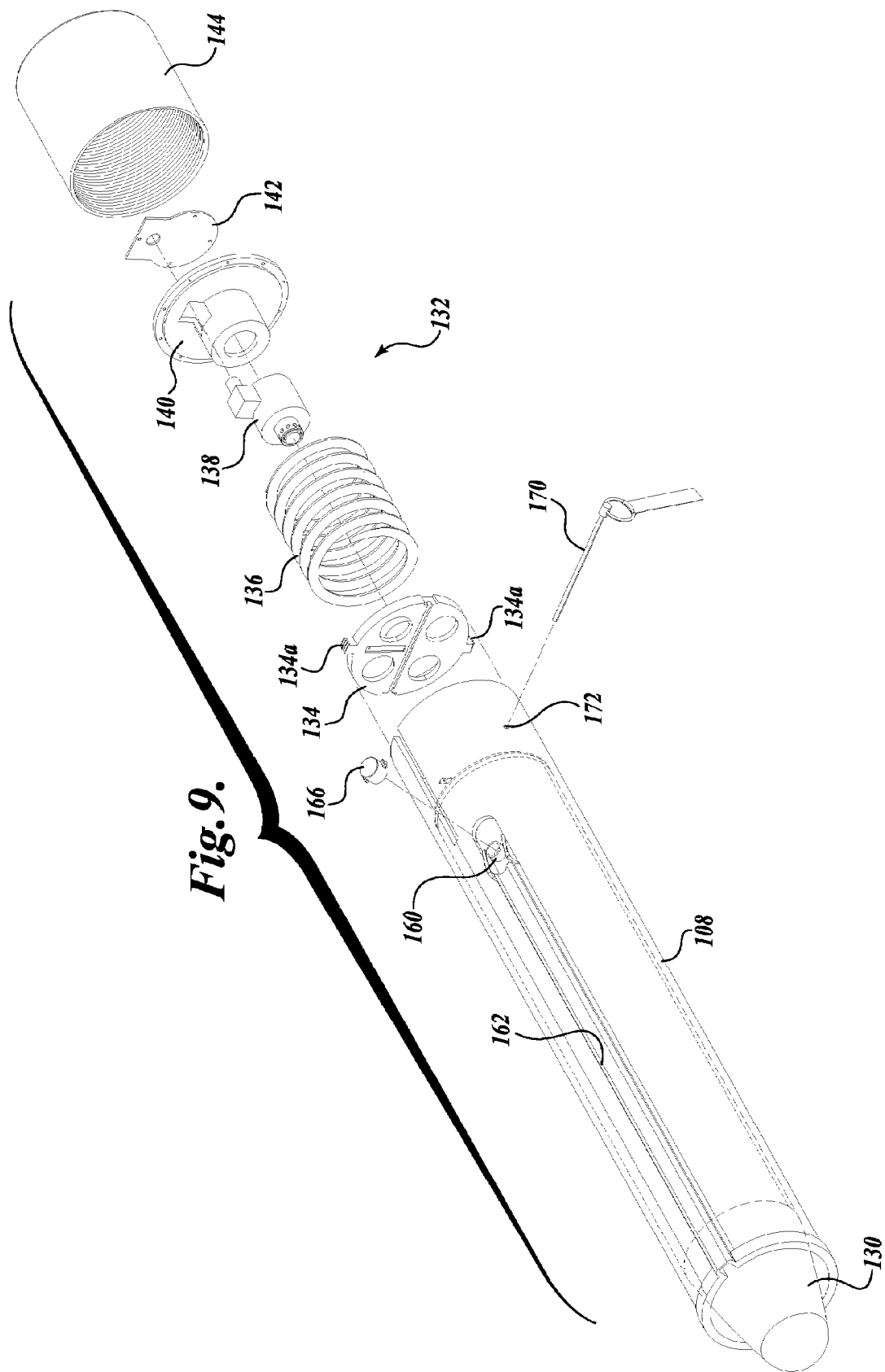
FIG. 9 is a stores carrier mountable in the subcarriage of FIG. 8 or in the pylon of FIG. 2 that includes a powered ejection mechanism for ejecting a store.

The stores carrier 108 shown in FIG. 8 includes an ejection mechanism shown in the exploded view in FIG. 9. The ejection mechanism is designed to eject the store 130 from the carrier 108. The store 130 is the type that is not self-propelled and, thus, is forcibly ejected from the stores carrier 108. The ejection mechanism 132 is shown in exploded view in FIG. 9. It includes an ejection plate 134, a coil spring 136, a detent retaining mechanism 138, a backing plate 140, a retaining plate 142 for the detent mechanism 138, and a cocking cylinder 144.

Figure 10A:
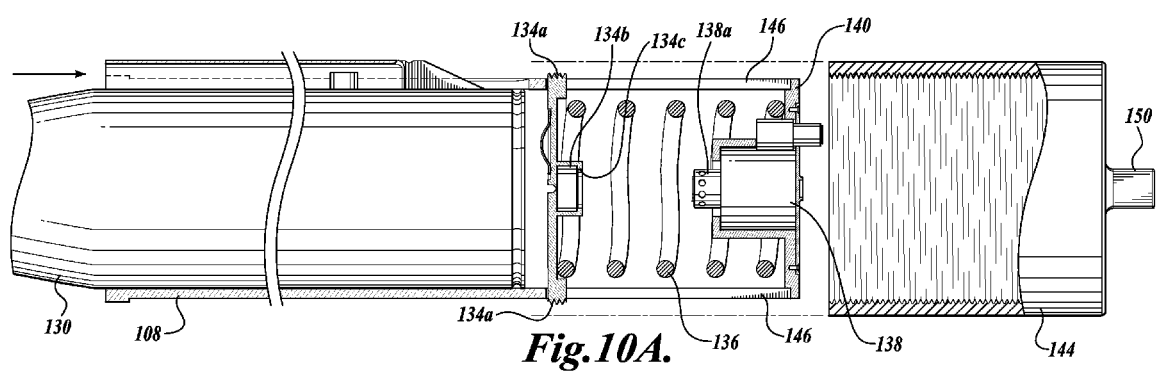
FIGS. 10A, 10B, 10C, and 10D illustrate the ejection mechanism in a cocked and quiescent state and the mechanism for cocking the ejection mechanism.

Referring now to FIGS. 9 and 10A, the rearward end of the carrier 108 has two longitudinal slots 146, which run from the rearward end forwardly. These two slots are diametrically opposed from each other. The ejection plate 134 carries two diametric tabs 134a that extend outwardly through the slots 146. The backing plate 140 is secured on the rear end of the carrier 108 by suitable fasteners (not shown). The coil spring 136 is positioned between the backing plate 140 and the ejection plate 134. The backing plate carries a central concentric cylindrical shell that extends forwardly from the central rear side of the backing plate 140. A detent retaining mechanism 138 is positioned in the cylindrical shell of the backing plate 140. A ball detent mechanism 138a extends forwardly through an opening in the forward end of the cylindrical shell of the backing plate 140. The ball detent mechanism is of a conventional design where a plurality of ball bearings are positioned to radially extend outwardly from a series of radial slots in the extension 138a. Ejection plate 134 carries a rearwardly extending cylindrical member 134b having a rearward end with inwardly extending shoulder 134c. The inner diameter of the shoulder 134c is slightly larger than the outer diameter of the detent mechanism 138a and is axially aligned therewith.

Figure 10B:
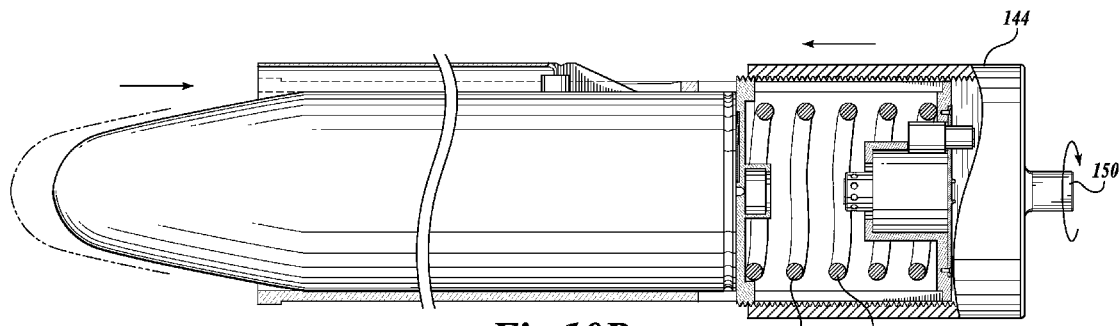
Figure 10C:
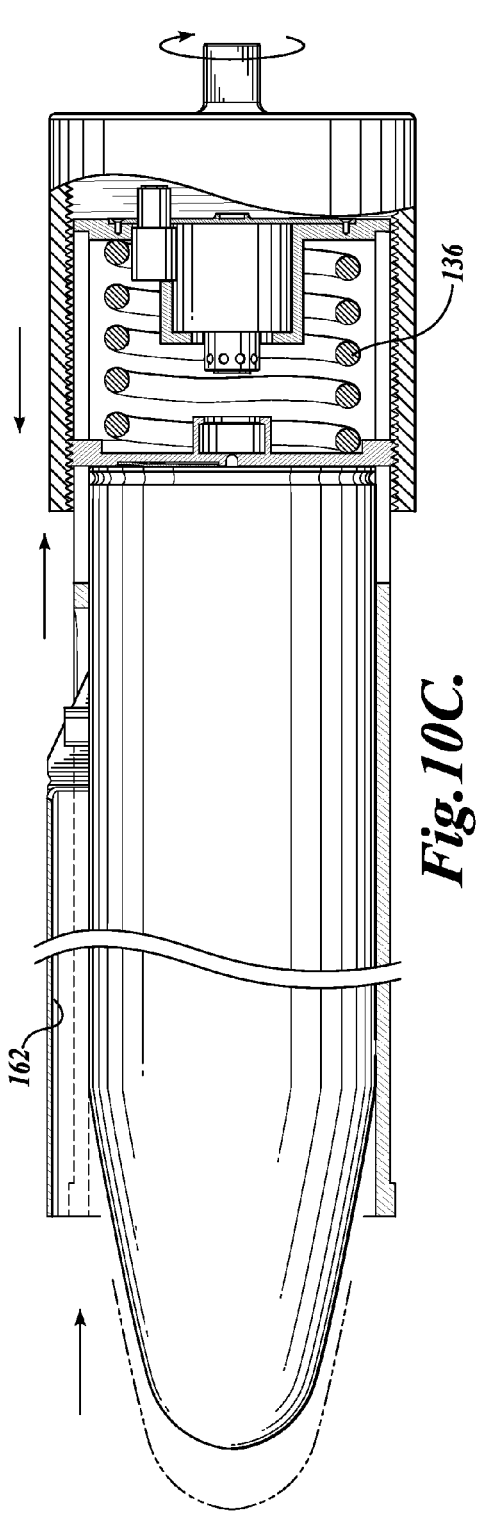
Figure 10D:
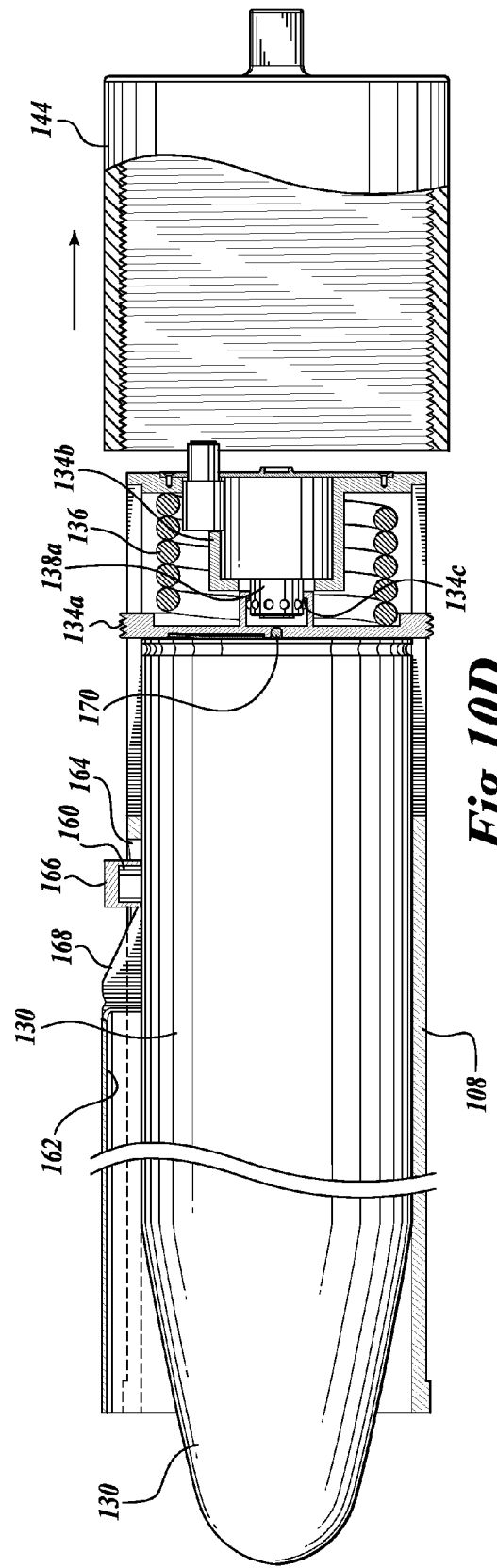

The cocking cylinder 144 comprises a cylindrical shell having a rear plate with a lug 150 thereon. The inner surface of the cocking cylinder 144 carries internal threads. The internal diameter of the cocking cylinder is slightly larger than the external diameter of the stores carrier 108. In use, the cocking cylinder is fitted over the rearward end of the carrier 108 until the internal threads in the cocking cylinder engage the external threads on the tabs 134a of the ejection plate 134. A suitable tool (not shown) is then affixed to the lug 150 and the cocking cylinder is rotated, for example, in a clockwise direction. The co-action of the internal threads in the cocking cylinder and the external threads on the tabs 134a serve to move the ejection plate rearwardly toward the detent mechanism against the bias of the spring 136. The cocking cylinder is rotated, as shown in FIGS. 10B and 10C, until, as shown in FIG. 10D, the cylindrical member 134b on the ejection plate 134 engages and moves past the forward end of the detent mechanism 138a. The detent mechanism 138a is then activated so that the balls extend outwardly from the radial ports therein. The shoulder 134c then engages the balls to prevent the ejection plate from moving in a forward direction against the bias of spring 136. The cocking cylinder 144 is then turned in the opposite direction to unthread it from the threaded tabs 134a, thus removing the cocking cylinder from the stores carrier.

The detent retaining mechanism contains an internal solenoid that expands the balls out of the radial apertures. This solenoid can be spring-loaded to keep it in place until activated by an external source. When the solenoid is activated by an external source, the balls in the detent device retract inwardly, releasing the ejection plate and causing the store 130 to be ejected from the stores carrier 108.

To retain the store 130 in the carrier 108 after the ejection mechanism has been cocked, and to provide electrical connections to the store 130 from the parent aircraft 12, a radially extending electrical connector male end 160 is provided on the outer surface of the store 130 toward its rearward end or anywhere along its length. This connector 160 travels in a longitudinal channel 162 provided in the external surface of the store carrier 108. An open slot 164 is provided at the rear end of the carrier 108 so that when the store is in place against the cocked ejection plate 134, the connector 160 is exposed. An electrical connector female end 166 is then positioned over the electrical connector male end 160 to provide electrical connectivity and to temporarily retain the store in place and prevent it from slipping out axially, should the carrier 108 be tipped in a downward and forward direction. The friction fit of the connector female end 166 over the connector male end 160, however, is such that when the ejection mechanism is released and the plate 134 urges the store forward, the connector 166 rides upwardly on a pair of ramps 168 provided forward of the connector 166, thus prying the connector female end 166 from the connector male end 160 and allowing the store to move forwardly and out of the carriage 108.

A safety pin 170 is also provided to prevent the ejection mechanism from operating prematurely. The pin is inserted in a diametric bore 172 in the carrier 108. The bore 172 is situated just forward of the ejection plate when in a cocked position. When the carrier 108 is loaded in the subcarriage assembly and the aircraft is ready to deploy, the pin 170 may be removed to ready the ejection mechanism.

While illustrative embodiments have been illustrated and described, it will be appreciated that various changes can be made therein without departing from the spirit and scope of the invention.

The embodiments of the invention in which an exclusive property or privilege is claimed are defined as follows:

1. A carriage and release system for stores carried on an aircraft, comprising:
   a bracket adapted for attachment to the aircraft; and
   a pylon mounted on said bracket wherein said pylon is selectively adjustable, by a power mechanism during flight, in a pitch direction relative to said aircraft, said pylon including a mounting port defined by a resilient first arm and a resilient second arm, said first and second arms having distal ends that are separated by a slot such that said mounting port is adjustable by resiliently biasing said distal ends of said first and second arms towards each other;
   means for resiliently biasing said distal ends of said first and second arms toward each other;
   wherein said first and second arms further define a downwardly open T-shaped slot having a width that is reduced by resiliently biasing said distal ends of said first and second arms towards each other.

2. The system of claim 1, further comprising a stores carrier mountable in said port, wherein said stores carrier is clampingly retained in said port when said first and second arms are biased toward each other.

3. The system of claim 2, wherein said stores carrier defines at least one axial channel for receiving a store.

4. The system of claim 2, further comprising:
   a first subcarriage adapted to releasably retain a store, said first subcarriage comprising a rail sized to be received by said downwardly open T-shaped slot for attachment to said pylon.

5. The system of claim 1, further comprising:
   a first subcarriage defining at least one stores carrier, said first subcarriage being removably attached to said pylon.

6. The system of claim 5, further comprising:
   a second subcarriage defining at least one stores carrier, and said second subcarriage adapted for attachment to said first subcarriage.

7. The system of claim 6, further comprising:
   a third subcarriage having a store depending therefrom, said store being releasable from said third subcarriage, said third subcarriage adapted for attachment to said second subcarriage.

8. The system of claim 4, wherein said first subcarriage defines a plurality of stores carriers.

9. The system of claim 4, further comprising:
   an ejection mechanism associated with said stores carrier and said first subcarriage, said ejection mechanism having a cocked mode and a quiescent mode, said ejection mechanism when released from said cocked mode being capable of ejecting a store contained in said stores carrier.

10. The system of claim 9, wherein said ejection mechanism comprises an ejection plate for contacting said store, a compressible spring bearing against said ejection plate, a cocking mechanism for compressing said spring while bearing against said ejection plate, and a detent mechanism for releasably holding said spring in a compressed position, thereby maintaining said ejection mechanism in its cocked mode.

11. The system of claim 1, wherein the power mechanism is attached to both said pylon and said bracket, for adjustably pivoting said pylon relative to said bracket, wherein said pylon is pivotally mounted to said bracket for movement in a pitch mode during flight.

12. The system of claim 11, wherein said power mechanism comprises at least one jackscrew assembly spaced from the pivotal mounting of the pylon to the bracket, and operatively connected to said pylon and said bracket to pivot said pylon upon rotation of said jackscrew.

13. The system of claim 12, wherein said power mechanism comprises a jackscrew assembly positioned on opposite sides of said pivotal mounting of said pylon to said bracket.

\* \* \* \* \*

UNITED STATES PATENT AND TRADEMARK OFFICE
CERTIFICATE OF CORRECTION

| | | |
|---|---|---|
| PATENT NO. | : 7,624,947 B2 | Page 1 of 1 |
| APPLICATION NO. | : 11/759857 | |
| DATED | : December 1, 2009 | |
| INVENTOR(S) | : K. A. Dortch et al. | |

It is certified that error appears in the above-identified patent and that said Letters Patent is hereby corrected as shown below:

Title Page

| COLUMN | LINE | ERROR |
|---|---|---|
| (73) Pg. 1, col. 1 | Assignee | "Black Rum Engineering Services LLC," should read --Black Ram Engineering Services LLC,-- |

Signed and Sealed this

Twentieth Day of April, 2010

David J. Kappos
*Director of the United States Patent and Trademark Office*